US012594592B2

(12) United States Patent
Angerer et al.

(10) Patent No.: US 12,594,592 B2
(45) Date of Patent: Apr. 7, 2026

(54) BENDING INSTALLATION AND MANIPULATOR WITH ROTATABLE GRIPPER ARRANGEMENT

(71) Applicant: TRUMPF Maschinen Austria GmbH & Co. KG., Pasching (AT)

(72) Inventors: Gerhard Angerer, Altenberg (AT); Michael Schernhammer, Leonding (AT); Florian Hausmann, Traun (AT); Florian Maier, Leonding (AT); Matthias Hoerl, Linz (AT); Helmut Theis, Pfarrkirchen (AT); Nenad Kovjenic, Linz (AT); Verena Steininger, Linz (AT); Klemens Freudenthaler, Linz (AT); Richard Edlbauer, Liebenau (AT); Walter Keplinger, Helfenberg (AT); Gerhard Gugler, Hofkirchen im Muehlkreis (AT); Alois Austaller, Roitham (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 375 days.

(21) Appl. No.: 18/039,788

(22) PCT Filed: Dec. 21, 2021

(86) PCT No.: PCT/AT2021/060481
§ 371 (c)(1),
(2) Date: Jun. 1, 2023

(87) PCT Pub. No.: WO2022/133507
PCT Pub. Date: Jun. 30, 2022

(65) Prior Publication Data
US 2024/0091843 A1     Mar. 21, 2024

(30) Foreign Application Priority Data
Dec. 23, 2020   (AT) .............................. A 51137/2020

(51) Int. Cl.
| | |
|---|---|
| *B21D 5/02* | (2006.01) |
| *B21D 43/10* | (2006.01) |
| *B25J 9/04* | (2006.01) |
| *B25J 15/06* | (2006.01) |

(52) U.S. Cl.
CPC ......... *B21D 43/105* (2013.01); *B21D 5/0281* (2013.01); *B25J 9/046* (2013.01); *B25J 15/06* (2013.01)

(58) Field of Classification Search
CPC .................. B21D 5/0281; B21D 5/002; B21D 43/105003; B21D 43/105; B21D 43/003
See application file for complete search history.

(56) References Cited

U.S. PATENT DOCUMENTS

| | | | |
|---|---|---|---|
| 4,989,444 A | 2/1991 | Murakami et al. | |
| 6,722,178 B1 | 4/2004 | Ito et al. | |
| 8,074,484 B2 * | 12/2011 | Denkmeier | .......... B21D 5/0281 72/422 |

(Continued)

FOREIGN PATENT DOCUMENTS

| | | |
|---|---|---|
| AT | 509 857 A4 | 12/2011 |
| CN | 103100810 A | 5/2013 |

(Continued)

OTHER PUBLICATIONS

International Search Report in PCT/AT2021/060481, mailed Apr. 25, 2022.

*Primary Examiner* — Debra M Sullivan
(74) *Attorney, Agent, or Firm* — Collard & Roe, P.C.

(57) ABSTRACT
A manipulator for components, in particular sheet metal parts, includes a base body mountable stationarily or movable along a guide arrangement, a first pivot arm pivotally coupled to the base body via a horizontal first pivot axis, a second pivot arm pivotally coupled to the first pivot arm via a horizontal second pivot axis and a third pivot arm pivotally coupled to the second pivot arm via a horizontal third pivot axis. A first axis of rotation extending radially to the third (Continued)

pivot axis is formed on the third pivot arm. A gripper support arm is rotatably coupled to the third pivot arm via the first axis of rotation and extends radially to the first axis of rotation. A gripping arrangement is rotatably coupled to the gripper support arm via a second axis of rotation spaced from the first axis of rotation. A bending installation includes the manipulator.

23 Claims, 6 Drawing Sheets

(56) References Cited

U.S. PATENT DOCUMENTS

| 9,278,383 | B2 | 3/2016 | Fischereder et al. |
| 2005/0097940 | A1 | 5/2005 | Strasser et al. |
| 2013/0160508 | A1 | 6/2013 | Fischereder et al. |
| 2016/0257002 | A1 | 9/2016 | Takayama |
| 2020/0230679 | A1 | 7/2020 | Sato et al. |

FOREIGN PATENT DOCUMENTS

| DE | 689 04 261 | T2 | 5/1993 |
| EP | 0 354 559 | B1 | 1/1993 |
| EP | 1 916 072 | A1 | 4/2008 |
| EP | 2 688 693 | B1 | 10/2015 |
| IT | 990268 | A1 | 10/2000 |
| JP | H06-328140 | A | 11/1994 |
| JP | 2006-123009 | A | 5/2006 |
| JP | 2016-163921 | A | 9/2016 |
| WO | 2019/012990 | A1 | 1/2019 |

* cited by examiner

Fig.9               Fig.10
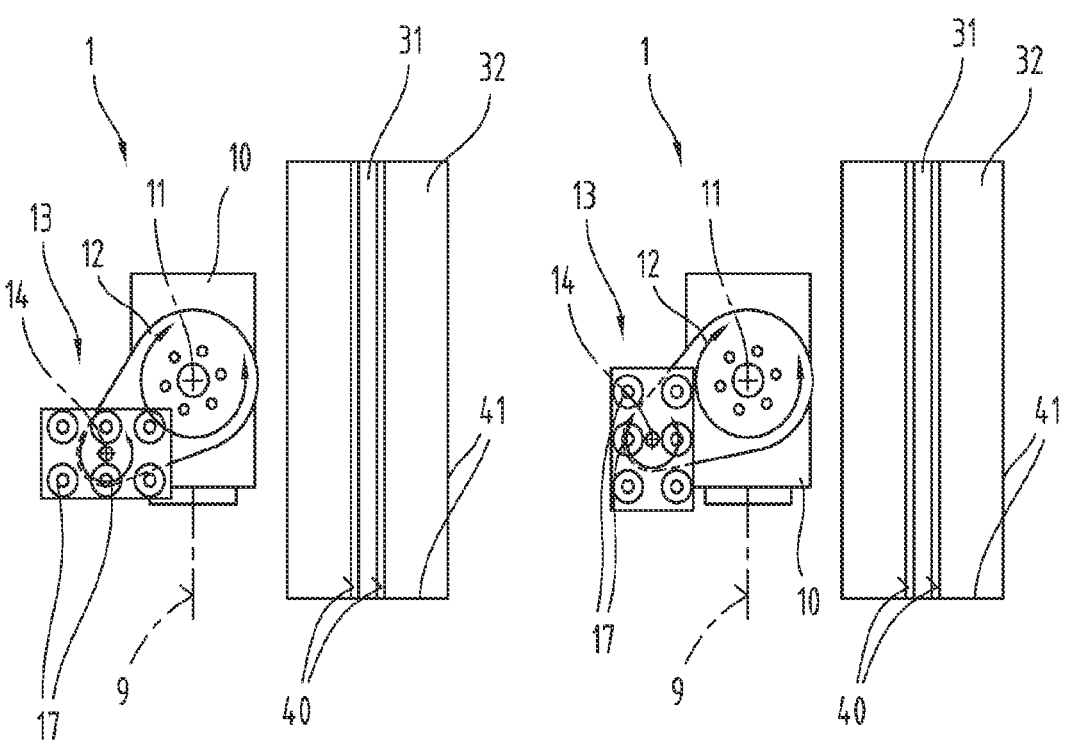
Fig.11
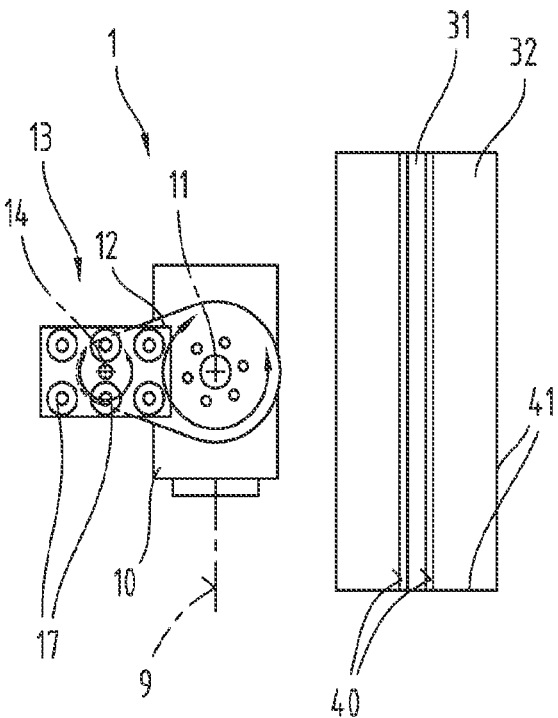

1

BENDING INSTALLATION AND MANIPULATOR WITH ROTATABLE GRIPPER ARRANGEMENT

CROSS REFERENCE TO RELATED APPLICATIONS

This application is the National Stage of PCT/AT2021/060481 filed on Dec. 21, 2021, which claims priority under 35 U.S.C. § 119 of Austrian Application No. A51137/2020 filed on Dec. 23, 2020, the disclosure of which is incorporated by reference. The international application under PCT article 21(2) was not published in English.

BACKGROUND OF THE INVENTION

1. Field of the Invention

The invention relates to a manipulator for components, in particular sheet metal parts, as well as a bending installation.

2. Description of the Related Art

In modern machining centers, workpiece and component transport is often fully automated. In order to manipulate components, in particular bent workpieces and profiles, the use of manipulators with gripping arrangements, in particular with negative pressure and/or vacuum grippers has become widely established. However, the use of these gripping arrangements for small components and profiles is limited or involves increased effort. For example, for small components and profiles to be bent and, in this case to be bent several times, it is necessary to change the hold between the individual machining and/or bending steps and, if necessary, do this several times. Setting down and/or changing the hold prolongs machining times and therefore has a negative effect on unit costs.

In order to remedy this problem, the person skilled in the art is familiar with special, custom-made gripping arrangements that which can be used to bend small components and profiles. However, such gripping arrangements are technically and structurally complex and are not universally applicable. Gripping arrangements that use pincer grippers in various embodiments are also known in the prior art. Here, it is common to provide auxiliary devices to pick up, temporarily fix, set down and transport components of different sizes. However, the use thereof is unsatisfactory insofar as the small components require an additional device to be provided. Furthermore, not all component geometries and bent parts are suitable for auxiliary manipulation using pincer grippers. EP 2688693 B1 for example, presents a manufacturing plant with an auxiliary device for intermediately positioning workpieces, wherein the auxiliary device comprises interacting holding elements. This enables complex gripping and/or repositioning of components and/or profiles.

Special, custom-made vacuum gripping arrangements are also used in an attempt to overcome the disadvantages of the prior art. WO 2019012990 A1 presents a workpiece feeding device, with which the spacing dimension of the rising portions can be reduced when a sheet workpiece is bent. An example of this is EP 0354559 B1, which suggests an industrial robot to pass a plate-shaped material into a press brake, wherein the industrial robot comprises arm parts which contain a holding part for holding the material and a release device for terminating holding by the holding part.

Using known, custom-made gripping arrangements or also using additional gripping arrangements for changing the hold extends the processing time and/or set-up time, which is why processing small components is uneconomical and requires more time.

SUMMARY OF THE INVENTION

The problem to be solved of the present invention is to overcome the disadvantages of the prior art and to provide a device, with which a user is able to accurately and easily feed small components, in particular sheet metal parts with relatively short leg lengths, into machining with technically simple means, and to manipulate these components in an cost-efficient manner. This is achieved in particular by means of standard gripping arrangements.

This problem is solved by a manipulator and bending installation in accordance with the claims.

The invention relates to a manipulator for components, in particular for sheet metal parts, wherein the manipulator is configured to pick up, transport, hold and/or set down a component. The manipulator comprises a base body, which can preferably be moved along a guide arrangement. In this case, a guide arrangement comprises, in particular, a rail guide extending linearly or linear rail elements. The linear rail elements may preferably be aligned parallel to a longitudinal axis of a bending table of a bending machine. Alternatively, the manipulator or its base body can also be positioned in a stationary manner, in particular firmly anchored to the bottom. The base body can also be configured to be rotatable about a vertical axis of rotation. The manipulator comprises a first swivel arm pivotally coupled to the base body via a horizontal first swivel axis, a second swivel arm pivotally coupled to the first swivel arm via a horizontal second swivel axis, a third swivel arm pivotally coupled to the second swivel arm via a horizontal third swivel axis, wherein a first rotational axis extending radially to the third swivel axis is formed on the third swivel arm. According to the invention, a gripper support arm is formed, which is rotatably coupled to the third pivot arm via the first axis of rotation, wherein the gripper support arm extends radially to the first axis of rotation and wherein a gripping arrangement is rotatably coupled to the gripper support arm via a second axis of rotation which is spaced apart from the first axis of rotation.

The configuration of a manipulator according to the invention enables efficient machining of components, in particular of bent parts. The manipulator configured according to the invention is not only capable of—and as is known from the prior art—performing pivoting movements about horizontal axes, but can additionally also perform rotational movements about at least two axes of rotation. This offers the advantage that no setting down and/or changing the hold is necessary for components, upon which several machining steps or, respectively several bending steps are to be carried out. The use of the manipulator according to the invention is particularly expedient for small components and also for profiles. In particular, in the case of small components and profiles to be bent and especially those to be bent several times, it is not necessary to change the hold between the individual machining or bending steps. This shortens machining times, which has a positive impact on unit costs, among other things. Furthermore, the manipulator configuration according to the invention makes it possible to move the manipulator comparatively close to the bending machine or to a lower tool, which is arranged on a bending table. The quasi-eccentric or offset configuration offered by a gripper support arm of a manipulator makes it possible to bring the gripping arrangement and the component held by the gripping arrangement close and possibly even directly to a bending machine, in particular to the lower tool of the bending machine. This type of extension makes possible machining or bending a component in several stages without, as a rule, time-consuming gripper repositioning. Another advantage is that by providing the quasi-eccentric gripper support arm, standard gripping arrangements can be arranged or mounted and therefore no ex-pensive and/or technically complex custom-made products are required. The manipulator according to the invention offers performance and time advantages for components or sheet metal components with relatively short leg lengths to be shaped. These relatively short leg lengths can even be present in the portion between the manipulator or its gripping arrangement and the lower tool of a bending machine, that is to say can be positioned in the manipulator-side feed area of a bending machine. By simplifying the movement of the manipulator, it is also possible to reduce the associated programming complexity. Programming is thus both faster and less error prone. Collisions can be avoided by reducing or even eliminating complex and risky hold changes. The risk of collision can be further reduced by a general increase in distance between the manipulator and the machines, in particular bending machines, in the immediate vicinity or manipulation area thereof. Process reliability is increased overall by reducing or even the eliminating position faults or possible vacuum losses by avoiding hold changes.

It is necessary to expressly point out that the wording: "the manipulator comprises a first pivot arm pivotally coupled to the base body via a horizontal first pivot axis" can mean both a direct connection between the base body and first pivot arm, but of course can also mean an indirect connection between the base body and first pivot arm. The manipulator can therefore be, for example, both a three-axis manipulator and a six-axis manipulator, in particular a six-axis articulated robot. The respective embodiment is within the skill of the person skilled in the art, who would adapt the type and number of pivot axes to the respective requirements of the specific application.

Furthermore, it may be expedient for the first axis of rotation and the second axis of rotation to be arranged parallel to one another. It is possible to realise a technically or structurally more simple manipulator structure due to this advantageous advancement. The parallelism of the two axes of rotation can also be advantageous with respect to the programmability or what is known as the 'teaching' of a manipulator.

The gripping arrangement may further be provided to comprise a base element rotatably mounted on the gripper support arm and a gripper element that can be coupled to the base element as required and which can in particular be changed without any tools. Providing a rotatably mounted base element makes rotating the gripping arrangement about the second axis of rotation technically possible. By providing a gripper element, which can be coupled to the base element as required, various types of gripper elements can be arranged or the gripper element can be changed in the event of a fault or maintenance and repair work. If the gripper element can be changed without tools or with few work steps, such maintenance and repair work can be carried out particularly easily and quickly, if necessary. It may be expedient for the gripper elements, which can be arranged on the base element, to be standard gripper elements, i.e. no special configurations or specially customised adapters are necessary for coupling to the base element.

Furthermore, the gripper element may be provided to comprise a pincer gripper and/or a magnetic gripper. Depending on the type, size or geometry of components or sheet metal parts provided for machining or manipulation, it may be expedient to use pincer grippers and/or magnetic grippers. The person skilled in the art knows generic pincer grippers or magnetic grippers, as well as their advantages and disadvantages, sufficiently therefore these require no further explanation here. It can be advantageous for the gripper element to comprise either a pincer gripper or a magnetic gripper, wherein it is possible to change or restructure between the two types of gripper elements. However, it can also be advantageous for the gripper element to be configured as a combined gripper element with the functions of pincer and magnetic grippers.

A further advantageous embodiment provides the gripper element comprising a negative-pressure gripper and at least one negative-pressure gripper element being formed on the negative-pressure gripper. Generic negative-pressure grippers are sufficiently known to the person skilled in the art and therefore require no further explanation. The at least one negative-pressure gripper element can, in particular, be suction cups or suction-cup-like application means, which are configured for sealing abutment with a component. In principle, the gripper element can be configured as a combined gripper element and, depending on specific requirements, combine the functions of pincer grippers, magnetic grippers and/or negative-pressure grippers, for example.

According to an advancement, it is possible for a vacuum line to be formed, which is formed as a rotary union in the transition portion between the third pivot arm and the gripper support arm and/or in the transition portion between the gripper support arm and the gripping arrangement. A vacuum line can be formed to supply a negative-pressure gripper. In order to enable fault-free or less fault-prone operation of the manipulator, it is expedient for the required vacuum lines not to be attached to the outside of the manipulator, but arranged at least partially inside the pivot arms and the gripper support arm. Suitable rotary unions can be provided on transition portions for this purpose, so that a rotation or rotation of the gripper support arm and/or the gripping arrangement can occur without risk of damage to the vacuum line. The technical configuration of rotary unions is sufficiently known to the person skilled in the art and therefore requires no further explanation at this point.

Furthermore, it may be expedient for the gripper support arm to be rotatably coupled to the third pivot arm via a coupling, which can be activated and deactivated as required, and by means of a first pivot bearing. Forming a releasable connection between the third pivot arm and the gripper support arm can be advantageous because this means the gripper support arm can be changed in order, for example, to mount an alternative, longer gripper support arm.

Furthermore, the gripping arrangement can be configured to be rotatably coupled to the gripper support arm by means of a second pivot bearing. The second pivot bearing can enable the gripping arrangement to rotate about its own axis, i.e. about the second axis of rotation.

Furthermore, a torque support can be arranged in a rotationally fixed manner on the third pivot arm, preferably for a releasably configured torque support to be formed. This torque support can be advantageously arranged on the portion of the third pivot arm facing the gripper support arm. The second axis of rotation can be rotated relative to a rotation of the first axis of rotation by means of a torque support arranged in a rotationally fixed manner on the third pivot arm. Doing so can realise a common drive of the gripper support arm and the gripping arrangement.

According to a particular embodiment, it is possible for a toothed belt transmission to be formed, said toothed belt transmission comprising a first gear, which is rotationally fixed relative to the first axis of rotation and comprises a second gear, which is rotatable about the second axis of rotation, said toothed belt transmission comprising a belt coupling the first gear and the second gear in movement. This toothed belt transmission is configured to adjust the angular position of the gripping arrangement. By providing a toothed belt transmission, the gripping arrangement and the gripper support arm can be coupled in movement. In this way, it can be advantageous for a common drive to be formed for the gripping arrangement and the gripper support arm. This is the case, insofar as no separate mechanism is to be provided for moving both elements, thereby making a comparatively simple technical configuration possible. A control for such a rotary drive or the toothed belt transmission is known to the person skilled in the art and therefore requires no further explanation here.

Alternatively, a separate, controllable rotary drive can be allocated to the first gear. This rotary drive can be positioned on the gripper support arm. Preferably, this rotary drive is formed centrally with respect to the first axis of rotation or is arranged comparatively closer to the first than to the second axis of rotation. Similar measures can apply to the first spur gear of a spur gear transmission described below. This can lead to a favorable weight ratio or maintaining a low structurally determined load moment at the gripper end or at the tool center point of the manipulator. This can maintain comparatively high load-bearing capacity or performance of the manipulator.

In an advantageous advancement, the first gear can be provided to comprise a larger diameter than the second gear. Providing a first gear, which is small relative to the second gear, creates the possibility that even slight rotational movements of the first gear by a few degrees, for example, bring about a significantly greater or further rotational movement of the second gear and, associated with this, a greater rotational movement of the gripping arrangement. With this transmission ratio, simple and precise adjustability or positionability of the gripping arrangement or of the component manipulated by the gripping arrangement is possible.

In particular, it can be advantageous for a first rotary drive to be configured to rotate the gripper support arm about the first axis of rotation and for a second rotary drive, acting independently of the first rotary drive, be configured to rotate the gripping arrangement about the second axis of rotation. An embodiment configured in this way can both enable an independently or individually executable rotational movement of the gripper support arm and of the gripping arrangement. The command for the respective rotation of the gripping arrangement and/or of the gripper support arm can be sent to the rotary drives, for example, by a bending program. Performing the rotational movement of the gripping arrangement can, by means of the second rotary drive, take place independently of a possibly simultaneous rotational movement of the gripper support arm, which can be brought about by the first rotary drive. This advantageous advancement can additionally improve the free motion of the manipulator and thus further contribute to versatile, flexible and the most collision-free use of the manipulator. In addition, this can simplify movements of the manipulator, which can have a positive effect on the associated programming. This can lead to manipulator programming that is both faster and less susceptible to faults.

In an advantageous advancement, the second rotary drive can be configured as an electromotive actuator, preferably as a stepping motor, or the second rotary drive can be configured as a pneumatic actuator, the second rotary drive being secured to the gripper support arm. Depending on what is required, meaning depending on the bending situation or programme sequence, a stepping motor can rotate the gripping arrangement into the respectively required position. An electric motor with a belt drive can also be provided. Alternatively and particularly preferably, a pneumatic actuator can also be advantageous instead of an electromotive actuator. In particular, if the gripper element comprises a negative-pressure gripper element, configuring the second rotary drive as a pneumatic actuator can be expedient. This applies particularly when the negative-pressure gripper element, in addition to its vacuum supply, also has an over-pressure supply in order to be able to set down or blow off sheet metal parts, for example. Such an overpressure supply can, if necessary, also be used by the pneumatic actuator. In this case, for example, a pneumatic cylinder with a toggle lever or with a rack-and-pinion combination can initiate the rotation about the second axis of rotation. In addition, a pneumatic pivot drive would also be conceivable. As a further alternative, a spindle drive with a worm gear or rack-and-pinion combination would also be conceivable. In doing so, the second rotary drive, when it is formed on the gripper support arm and preferably on the underside of the gripper support arm, can be functionally coupled to the gripping arrangement by means of a belt or of comparable coupling means, so that the rotary movement initiated by the second rotary drive can be transmitted to the gripping arrangement.

Furthermore, configuring the second rotary drive to rotate the gripping arrangement between a first end stop and a second end stop, wherein a rotational movement of up to 180° can preferably be carried out between the first end stop and the second end stop, can be extremely advantageous. Since the respective rotational movement about the first axis of rotation and about the second axis of rotation can take place independently of one another, it can be sufficient and also contribute to the avoiding collisions to limit a rotational movement about the second axis of rotation. This can be a rotational movement carried out, for example, between 0° and 180°, or carried out between 0° and 270°.

Furthermore, a spur gear transmission can be provided, configured to comprise a first spur gear, which is rotatable about the first axis of rotation and comprise a second spur gear, which is rotatable about the second axis of rotation, wherein the first and the second spur gear interact directly or indirectly in a movement-coupled manner. As a result of this configuration, a direct mechanical drive connection can be created. This can achieve effects similar to those of the toothed belt transmission described above. It can also be expedient for a third spur gear to be formed between the first and the second spur gears, which is in meshing engagement with the first and the second spur gears, so that a rotational movement of the gripper support arm and the gripping arrangement in the same direction is possible.

Furthermore, a maximum height of the projecting portion of the gripper support arm can be provided, including the gripping arrangement held on the gripper support arm, which is smaller than the structural height of a lower tool relative to a bending table of a bending machine. In particular, the greatest height can be a maximum of 150 mm, preferably a maximum of 100 mm A construction or construction height as compact as possible means that the gripping arrangement or a component manipulated by the gripping arrangement can be brought close or even directly to the lower tool. In particular, these measures ensure that the gripping arrangement can be moved relatively close or directly to the lower tool of a bending machine without rising above the component support plane of the lower tool, in particular a sheet metal part provided for support on the lower tool. As a result, components with relatively short leg lengths can also be manipulated or fed to a bending machine without the need for changing, changing the hold or repositioning the gripping arrangement with respect to the component to be machined. This can increase performance and maintain short manipulating and machining cycle times.

Another advantageous embodiment provides the supporter arm to comprise a first support arm portion and a second support arm portion, wherein the first support arm portion and the second support arm portion are arranged offset to each other in the direction of the first axis of rotation or second axis of rotation. By configuring the gripper support arm with a gradient or with an offset, an advantageous, low maximum height of the gripper support arm can be realized in a technically simple manner A low height of the gripper support arm, including the gripping arrangement held on the gripper support arm, can be advantageous as the arrangement can be brought as close as possible to a lower tool. In addition, this can maintain a low projection height of the end effector or end portion projection length of the manipulator, resulting in the obtainable load moment of the manipulator increasing or being kept high.

According to an advancement, it is possible for a support leg length of the gripper support arm, said support leg length extending between the first axis of rotation and the second axis of rotation, to be shorter than a length of the first, second and/or third pivot arm. A gripper support arm, which is short in relation to the pivot arms, can be favorable from a static or structural point of view.

It can also be extremely advantageous for the base element to comprise at least two gripper element support arms, each having a first end portion and a second end portion, said gripper element support arms being radially spaced apart from the second axis of rotation, and said gripper element support arms being adjustably guided and releasably fixed at their first end portion in preferably arcuate guide sections in the base element of the gripping arrangement, and said gripper element support arms having a gripper element at their second end portion. This adjustment can be carried out both manually and automatically. It is expedient for the first end sections to be arranged at an equal and in particular also constant distance to the second axis of rotation. A releasable connection between the first end portions and the base plate can be fulfilled by means, for example, of a thread and nut. However, a bayonet-type fixing would also be conceivable, for example. A connection that can be released or established without tools or manually is advantageous. In order for the respective first end portion to be at a constant distance from the second axis of rotation, the respective guide portion can comprise the shape of an arc segment, which extends in the circumferential direction about the second axis of rotation. The respective first end portion is formed with a central axis, said central axis preferably being arranged parallel to the second axis of rotation. It may also be expedient for the gripper element support arms to be elongated and to extend in the longitudinal direction from the first to the second end portion. As the respective second end portion is rotatable in the circumferential direction about the central axis of the respective associated first end portion, the gripper element can be adaptable to a plurality of component geometries. It is thus possible for the first end portion to be rotated completely, i.e. 360° or more, about the central axis, or for the first end portion to be rotated between stop limits.

This has also proven advantageous if the at least two gripper element support arms, preferably in the region of their respective first end portion, comprise fixing means, said fixing means being configured to releasably fix the at least two gripper element support arms relative to the base element. The fixing means can be, for example, a pivotable lever which, when brought into its fixing or locking position, is coupled to the base element or components on the base element. This prevents or impedes undesired movement of the gripper element support arms in the circumferential direction of the second axis of rotation in a structurally simple manner.

An advancement, according to which a vacuum line of the at least one negative-pressure gripper element can be formed with a fluidic shut-off element, has also proven to be expedient. This type of shut-off element can be arranged, for example, in proximity to a suction cup or suction cup-like application means of the negative-pressure gripper element or can also be formed in a gripper element support arm. A shut-off element can be configured as a shut-off valve, which can be controlled or actuated in an automated manner, or can also be locked or unlocked manually. This advancement can simplify or facilitate individual adaptation of the gripping arrangement to different component sizes and component shapes. Thus, unnecessary negative-pressure gripper elements can be switched on and off as required.

Furthermore and in regard to its pivot axes, it has also proven advantageous for the manipulator to exclusively comprise said horizontal first pivot axis, said horizontal second pivot axis, said horizontal third pivot axis, said first axis of rotation and said second axis of rotation. This leads to the creation of a manipulator which, in connection with automated handling of plate-like workpieces, in particular in connection with sheet metal parts and bending installations for these sheet metal parts, has a favorable performance-to-cost ratio. Such kinematics make it possible to construct the manipulator in an optimized manner and to operate it economically. Nevertheless, with the corresponding degrees of freedom, it is possible to cover a comprehensive range of motion for workpiece handling.

The invention also relates to a bending installation comprising a bending machine, at least one manipulator, a guide arrangement with a guide axis, the at least one manipulator being movable along said guide axis, or a fixed anchoring for the at least one manipulator, and an installation control, which is configured to predefine movements and/or movement sequences of the at least one manipulator. This provides that the at least one manipulator is formed according to at least one of the preceding features or according to the definitions in at least one of the manipulator claims. Here, the guide arrangement comprises, in particular, a rail guide extending linearly or linear rail elements. The linear rail elements can preferably be aligned parallel to a longitudinal axis of the bending table of the bending machine, or the guide axis of the guide arrangement can run parallel to the rail elements.

The bending installation embodiment according to the invention enables efficient machining of components, in particular of bent parts. By means of the bending installation configured according to the invention with at least one manipulator, it is not only possible to carry out pivoting movements of the manipulator about horizontal axes, but rotational movements about at least two rotational axes can also be carried out. This offers the advantage that no setting down and/or changing the hold is necessary for components, upon which several machining steps or, respectively several bending steps are to be carried out. The use of the manipulator according to the invention is particularly expedient for small components and also for profiles. In particular, in the case of small components and profiles to be bent and especially those to be bent several times, it is not necessary to change the hold between the individual machining or bending steps. This shortens machining times, which has a positive impact on unit costs, among other things. Furthermore, the manipulator configuration according to the invention makes it possible to move the manipulator comparatively close to the bending machine or to a lower tool, which is arranged on a bending table. The quasi-eccentric or offset configuration of a manipulator gripping arrangement makes it possible to bring the gripping arrangement and the component held by the gripping arrangement close and possibly even directly to a bending machine, in particular to the lower tool of the bending machine. This kind of extension enables multi-stage machining or bending of a component without, as a rule, losing time by changing the gripper hold.

According to an advantageous advancement of the bending installation, the bending machine can be provided to comprise a bending table and a press beam, which can be adjusted relative to the bending table and, seen in plan view, at least one lower tool positioned within outer boundary edges of the bending table, a component support plane for the vertical support of at least one component to be machined being formed on said lower tool. A component can be supported by the manipulator on the component support plane of the lower tool in a simple manner and subsequently be subjected to a machining step by the press beam. In doing so, the outer boundary edges can be formed advantageously in plan view of the bending table.

BRIEF DESCRIPTION OF THE DRAWINGS

To improve understanding of the invention, it is described in more detail in the following figures.

These show in significantly simplified, schematic representation.

DETAILED DESCRIPTION OF THE PREFERRED EMBODIMENTS

Figure 1:
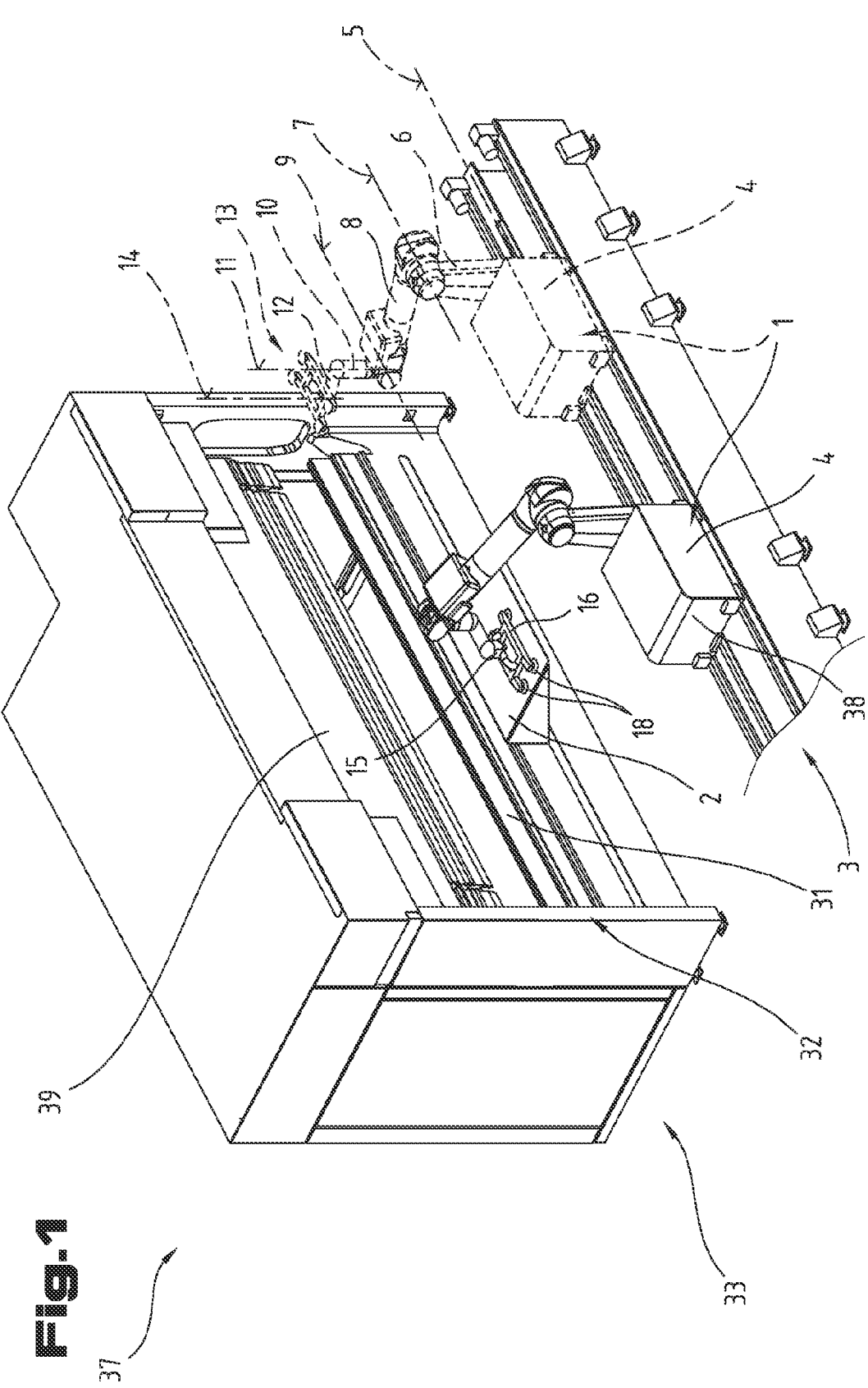
FIG. 1 A bending installation with an embodiment of the manipulator and a bending machine, wherein the manipulator is shown in two working positions FIG. 2 A further embodiment of the manipulator in side view FIG. 3 The embodiment of the manipulator according to FIG. 2 with a bending table and a lower tool in frontal view FIG. 4 The embodiment of the manipulator according to FIG. 2 with a bending table and a lower tool in side view FIG. 5 A first positioning example of the embodiment of the manipulator according to FIG. 2 in plan view FIG. 6 A second positioning example of the embodiment of the manipulator according to FIG. 2 in plan view FIG. 7 A third positioning example of the embodiment of the manipulator according to FIG. 2 in plan view FIG. 8 A fourth positioning example of the embodiment of the manipulator according to FIG. 2 in plan view FIG. 9 A fifth positioning example of the embodiment of the manipulator according to FIG. 2 in plan view FIG. 10 A sixth positioning example of the embodiment of the manipulator according to FIG. 2 in plan view FIG. 11 A seventh positioning example of the embodiment of the manipulator according to FIG. 2 in plan view FIG. 12 a further embodiment of the manipulator in three-dimensional view

It is worth noting here that the same parts have been given the same reference numerals or same component configurations in the embodiments described differently, yet the disclosures contained throughout the entire description can be applied analogously to the same parts with the same reference numerals or the same component configurations. The indications of position selected in the description, such as above, below, on the side etc. refer to the figure directly described and shown, and these indications of position can be applied in the same way to the new position should the position change.

FIG. 1 shows a bending installation 37 with a first embodiment of the manipulator 1 in accordance with the invention and a bending machine 33. The manipulator 1 is shown as an example in two different working positions. The bending installation 37 further comprises a guide arrangement 3 with a guide axis 38, the at least one manipulator 1 being movable along said guide axis 38. Alternatively, the at least one manipulator 1 is configured with a fixed anchoring. Furthermore, a system control (not depicted) is provided, which is configured to specify movements or movement sequences of the manipulator 1.

As shown, the bending machine 33 can comprise a bending table 32 and a press beam 39, which is adjustable relative to the bending table 32. Within the outer boundary edges 41 of the bending table 32, at least one lower tool 31 can be positioned in relation to the plan view according to the following FIGS. 5-11, on which a component support plane 40 can be formed for the vertical support of at least one component to be machined.

The manipulator 1 according to the invention is configured to pick up, transport, hold and/or set down components 2, in particular sheet metal parts. A base body 4 of the manipulator 1 is configured to be movable along the guide arrangement 3. The manipulator 1 comprises a first pivot arm 6 pivotally coupled to the base body 4 via a horizontal first pivot axis 5, a second pivot arm 8 pivotally coupled to the first pivot arm 6 via a horizontal second pivot axis 7, and a third pivot arm 10 pivotally coupled to the second pivot arm 6 via a horizontal third pivot axis 9. A first axis of rotation 11 extending radially to the third pivot axis 9 is formed on the third pivot arm 10. A gripper support arm 12 rotatably coupled to the third pivot arm 10 is formed via the first axis of rotation 11. In this case, the gripper support arm 12 extends radially in relation to the first axis of rotation 11. Furthermore, a gripping arrangement 13 is formed, which is rotatably coupled to the gripper support arm 12 via a second axis of rotation 14, which is spaced apart from the first axis of rotation 11.

FIG. 1 also shows that the first axis of rotation 11 and the second axis of rotation 14 can be formed parallel to one another. The gripping arrangement 13 may also comprise a base element 15 rotatably mounted on the gripper support arm 12 and a gripper element 16, which can be coupled to the base element 15 as required and which can in particular be changed without any tools. It is also possible, but not shown in the figures, for the gripper element 16 to comprise a pincer gripper and/or a magnetic gripper. It is also shown that the gripper element 16 can comprise a negative-pressure gripper 17, on which one or more negative-pressure gripper elements 18 are formed. Four negative-pressure gripper elements 16 arranged symmetrically on a gripper element 18 are shown as an example. Furthermore, a support arm length 36 of the gripper support arm 12, which extends between the first axis of rotation 11 and the second axis of rotation 14 may be shorter than a length of the first, second and/or third pivot arm 6, 8, 10.

Figure 2:
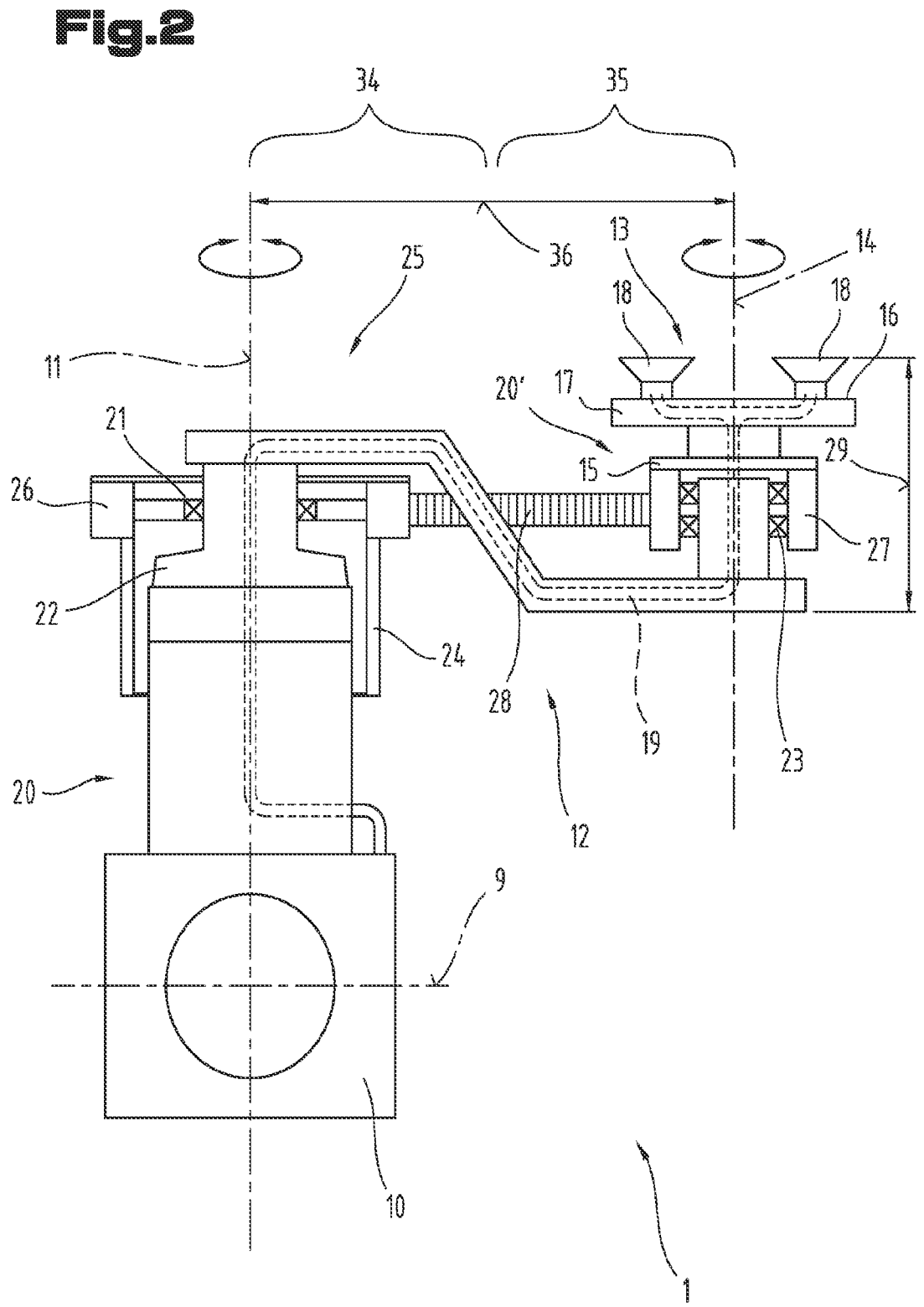

FIG. 2 shows a side view of a second embodiment of the manipulator 1. In principle, FIG. 2 shows a further and optionally independent embodiment of the manipulator 1, wherein the same reference numerals or component configurations as in the preceding FIG. 1 are used for identical parts. For this reason and in order to avoid unnecessary repetitions, reference is made to the detailed description in preceding FIG. 1.

The manipulator 1 according to the invention schematically depicted in FIG. 2 is configured to pick up, transport, hold and/or set down components 2, in particular sheet metal parts. The manipulator 1 is not shown in full in FIG. 2 but, for more clarity, begins with its third swivel arm 10, which is coupled via the third swivel axis 9 to a second swivel arm 8 (not shown). In addition, a first pivot arm 6, which is pivotally coupled to a base body 4 via a horizontal first pivot axis 5, and a second pivot arm 8, which is pivotally coupled to the first pivot arm 6 via a horizontal second pivot axis 7, are explicitly not shown or are hidden. A first axis of rotation 11 is formed on the third pivot arm 10 extending radially in relation to the third pivot axis 9. A gripper support arm 12 rotatably coupled to the third pivot arm 10 is formed via the first axis of rotation 11. In this case, the gripper support arm 12 extends radially in relation to the first axis of rotation 11. Furthermore, a gripping arrangement 13 is formed, which is rotatably coupled to the gripper support arm 12 via a second axis of rotation 14, which is spaced apart from the first axis of rotation 11.

The first axis of rotation 11 and the second axis of rotation 14 may be formed parallel to one another. Furthermore, as shown, the gripping arrangement 13 can be provided to comprise a base element 15 rotatably mounted on the gripper support arm 12 and a gripper element 16, which can be coupled to the base element 15 as required and which can in particular be changed without any tools. The gripper element 16 can be, for example, a pincer gripper, a magnetic gripper and/or a negative-pressure gripper 17. FIG. 2 shows a negative-pressure gripper 17, on which a plurality of negative-pressure gripper elements 18 can be arranged. This shows that a vacuum line 19 can be formed, which can be formed as a rotary union in the transition portion 20 between the third pivot arm 10 and the gripper support arm 12 and/or in the transition portion 20 between the gripper support arm 12 and the gripping arrangement 13.

The gripper support arm 12 can be rotatably coupled to the third pivot arm 10 and by means of a first pivot bearing 21 via a coupling 22, which can be activated and deactivated as required. The gripping arrangement 13 can be rotatably coupled to the gripper support arm 12 by means of a second pivot bearing 23. FIG. 2 also shows that a torque support 24, which is preferably detachable, can be arranged on the third pivot arm 10.

It is also shown that a toothed belt transmission 25 can be formed, which produces a movement-coupling connection between the gripper support arm 12 and the gripping arrangement 13. A first gear 26, which is rotatable about the first axis of rotation 11, and a second gear 27, which is rotatable about the second axis of rotation 14 are depicted. In addition, a belt 28 that couples the first gear 26 and the second gear 27 in terms of movement can be formed. It should be noted that this toothed belt transmission 25 shown in simplified form in FIG. 2 is only an exemplary embodiment and that, of course, further advantageous structural configurations known to the person skilled in the art are also conceivable and possible. The first gear 26 can have a larger diameter than the second gear 27. As a result of the movement-coupling belt 28 connection, a movement of the first gear 26 can, in principle, always lead to a movement of the second gear 27. However, decoupling the first gear 26 and the second gear 27 is also conceivable and perhaps advantageous.

Alternatively, a spur gear (not shown in the figure) can also be formed, which can be configured to adjust the angular position of the gripping arrangement 13. A generic spur gear transmission can comprise a first spur gear, which is rotatable about the first axis of rotation 11 and comprise a second spur gear which is rotatable about the second axis of rotation 14, wherein the first and the second spur gear interact directly or indirectly in a movement-coupled manner.

A maximum height 29 of the gripper support arm 12, including the gripping arrangement 13 held on the gripper support arm 12, can be smaller than a structural height 30 of a lower tool 31 relative to a bending table 32 of a bending machine 33. In particular, the greatest height 29 can be a maximum of 150 mm, preferably a maximum of 100 mm. The structural height 30 of the lower tool 31 relative to the bending table 32 of a bending machine 33 is shown in FIGS. 3 and 4.

The gripper support arm 12 can comprise a first support arm portion 34 and a second support arm portion 35, wherein the first support arm portion 34 and the second support arm portion can be arranged offset relative to one another in the direction of the first axis of rotation 11 or second axis of rotation 14. Advantageously, as shown in FIG. 2, the first and second support arm portion 34, 35 can be offset relative to one another in such a way that the second support arm portion 35 is lower than the first support arm portion 34 with respect to a horizontal position of the gripper support arm 12. This can result in a low maximum height 29.

Figure 4:
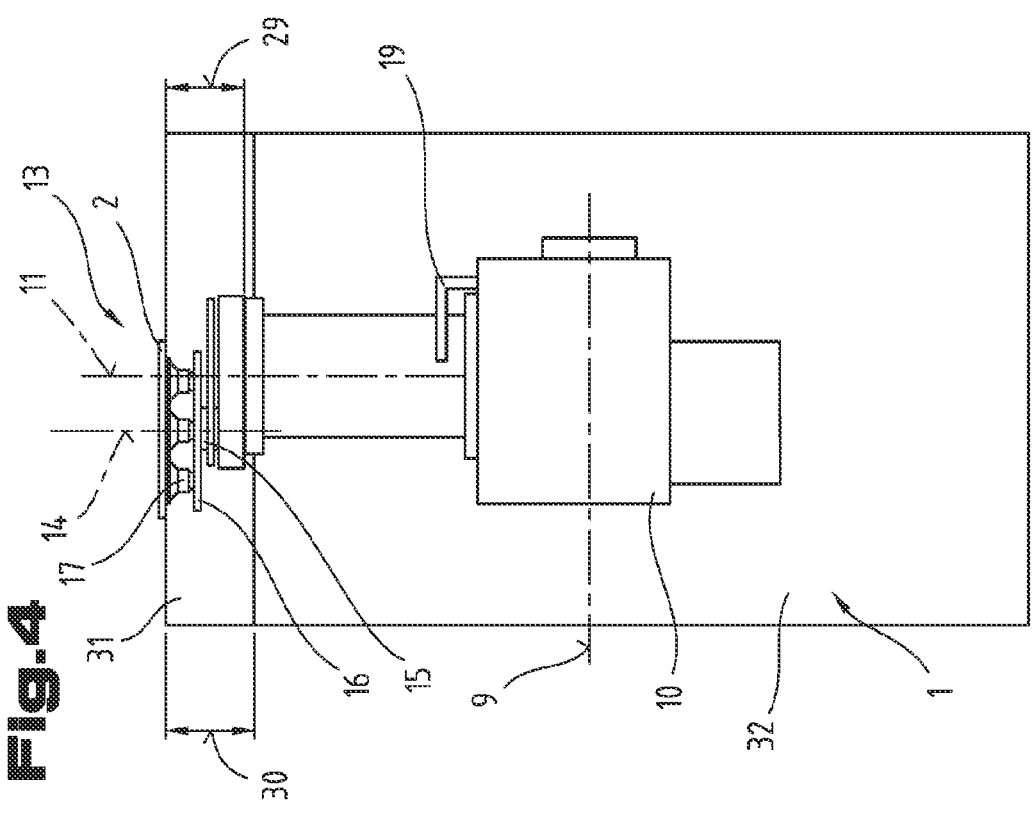
Figure 3:
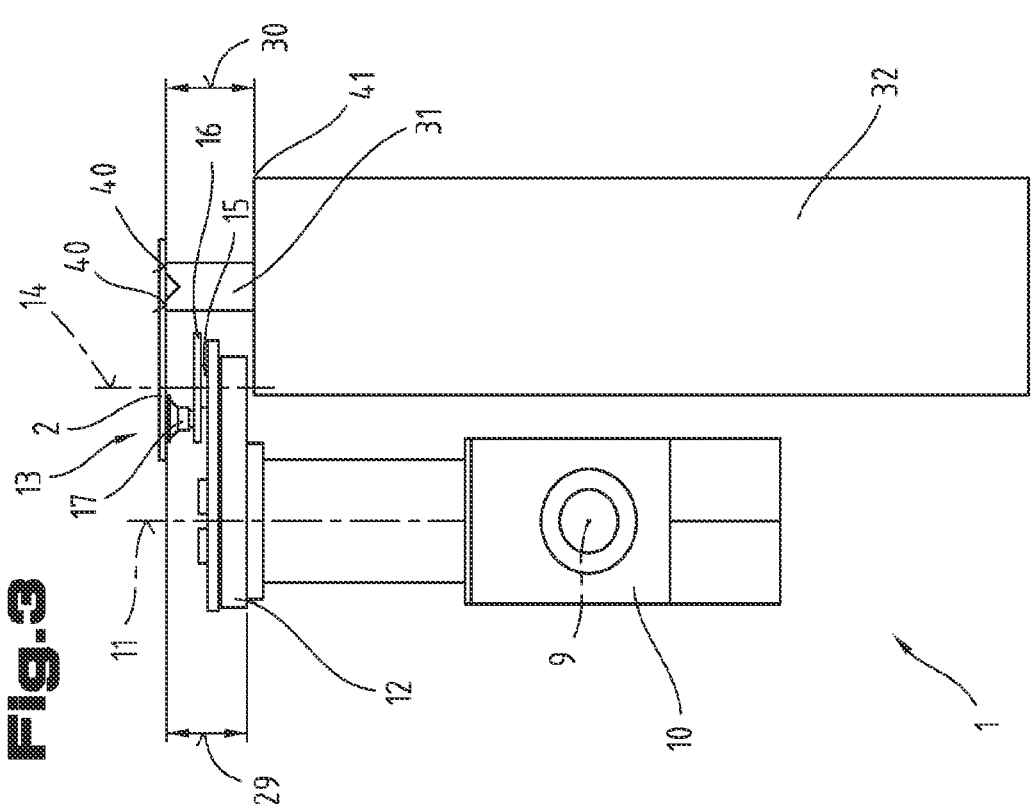

The two FIGS. 3 and 4 show a third embodiment of the manipulator 1 with a bending table 32 and a lower tool 31 in front view and in side view, respectively. In principle, FIGS. 3 and 4 show a further and optionally independent embodiment of the manipulator 1, wherein the same reference numerals and component configurations are used as in preceding FIGS. 1 and 2 for identical parts. For this reason and in order to avoid unnecessary repetitions, reference is made to the detailed description in the preceding Figures.

The manipulator 1 according to the invention shown in FIGS. 3 and 4 is configured to pick up, transport, hold and/or set down components 2, in particular sheet metal parts. The manipulator 1 is not shown in full in FIGS. 3 and 4 but, for more clarity, begins with its third swivel arm 10, which is coupled to a second swivel arm 8 (not shown) via the third swivel axis 9. A first axis of rotation 11 is formed on the third pivot arm 10 extending radially in relation to the third pivot axis 9. A gripper support arm 12 rotatably coupled to the third pivot arm 10 is formed via the first axis of rotation 11. In this case, the gripper support arm 12 extends radially in relation to the first axis of rotation 11. Furthermore, a gripping arrangement 13 is formed, which is rotatably coupled to the gripper support arm 12 via a second axis of rotation 14, which is spaced apart from the first axis of rotation 11.

The manipulator 1 shown, as well as the bending table 32 shown with a lower tool 31 mounted thereon, are components of a bending machine 33, which in turn is part of a bending installation 37. The bending installation 37 can also comprise a guide arrangement 3 (shown in FIG. 1) with a guide axis 38 or a fixed anchoring for the at least one manipulator 1 and comprises an installation control.

As shown, the bending machine 33 can comprise a bending table 32 and a press beam 39, which is adjustable relative to the bending table 32. The press beam 39 is shown, for example, in FIG. 1. Within the outer boundary edges 41 of the bending table 32, at least one lower tool 31 can be positioned in relation to the plan view according to the following FIGS. 5-11, on which a component support plane 40 can be provided for the vertical support of at least one component to be machined.

A maximum height 29 of the gripper support arm 12, including the gripping arrangement 13 held on the gripper support arm 12, can be smaller than a structural height 30 of a lower tool 31 relative to a bending table 32 of a bending machine 33. In particular, the greatest height 29 can be a maximum of 150 mm, preferably a maximum of 100 mm.

FIGS. 5 to 11 show seven positioning examples of a fourth embodiment of the manipulator 1 in plan view. The manipulator 1 according to the invention is configured to pick up, transport, hold and/or set down components 2 in particular sheet metal parts. In order to illustrate the positionability of the arrangement, the component 2 is not shown in FIGS. 5 to 11. As already shown in the preceding figures, the manipulator 1 is not shown in full in FIGS. 5 to 11 but, for more clarity, begins with its third swivel arm 10, which is coupled to a second swivel arm 8, which is no longer shown, via the third swivel axis 9. A first axis of rotation 11 is formed on the third pivot arm 10 extending radially in relation to the third pivot axis 9. A gripper support arm 12 rotatably coupled to the third pivot arm 10 is formed via the first axis of rotation 11. In this case, the gripper support arm 12 extends radially in relation to the first axis of rotation 11. Furthermore, a gripping arrangement 13 is formed, which is rotatably coupled to the gripper support arm 12 via a second axis of rotation 14, which is spaced apart from the first axis of rotation 11. FIGS. 5 to 11 also show a bending table 32 of a bending machine 33, wherein a lower tool 31 is arranged or mounted on the bending table 32.

As shown, the bending machine 33 can comprise a bending table 32 and a press beam 39, which is adjustable relative to the bending table 32. The press beam 39 is shown, for example, in FIG. 1. Within the outer boundary edges 41 of the bending table 32, at least one lower tool 31, on which a component support plane 40 can be provided for the vertical support of at least one component to be machined, can be positioned in relation to the plan view.

Figure 5:
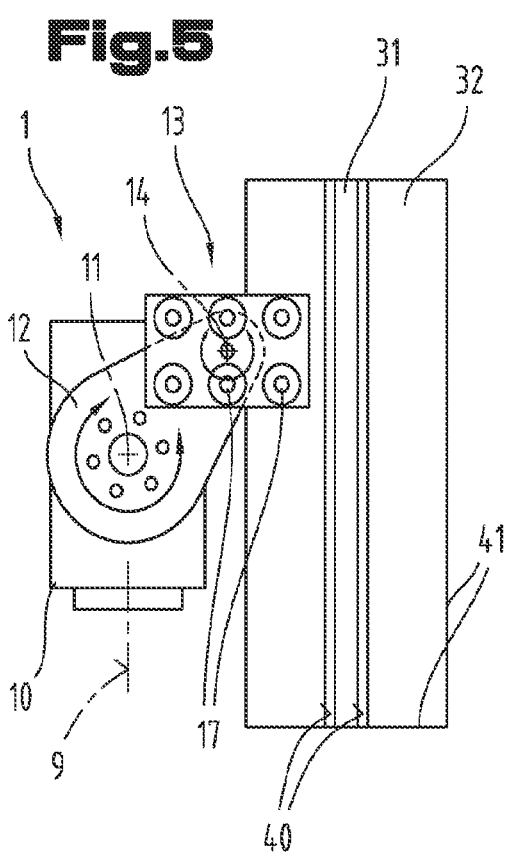
Figure 6:
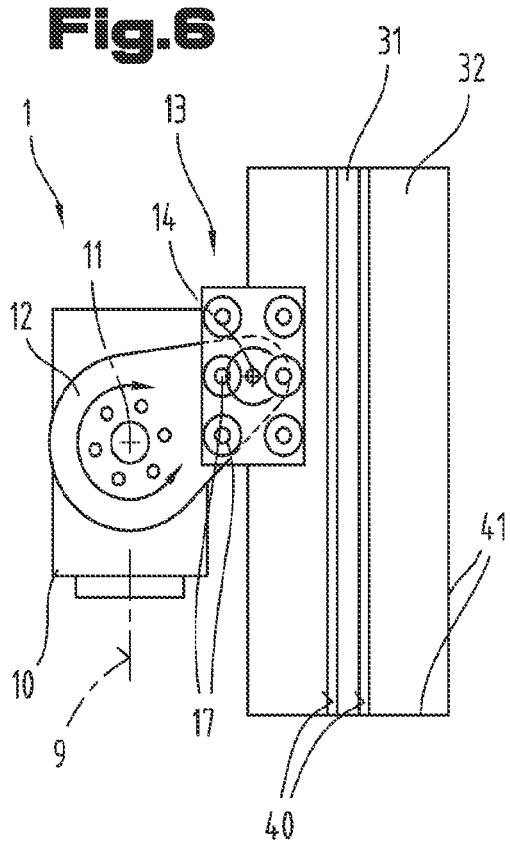
Figure 7:
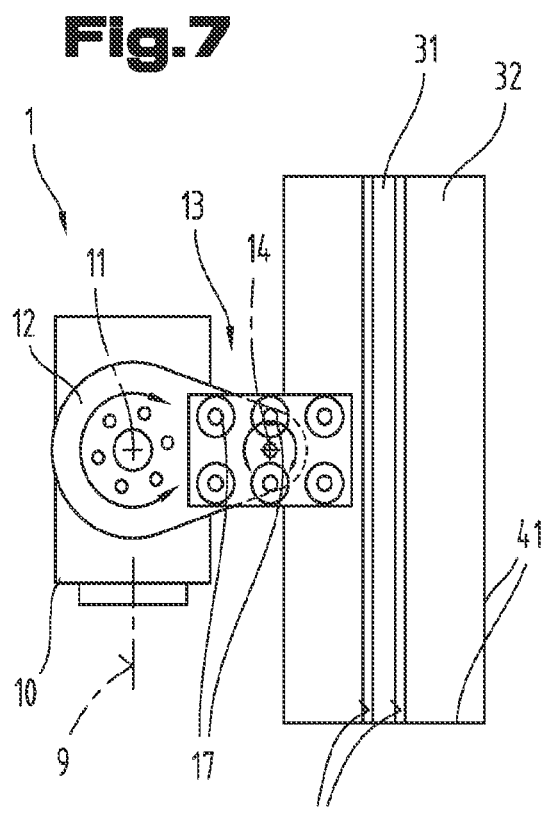
Figure 8:
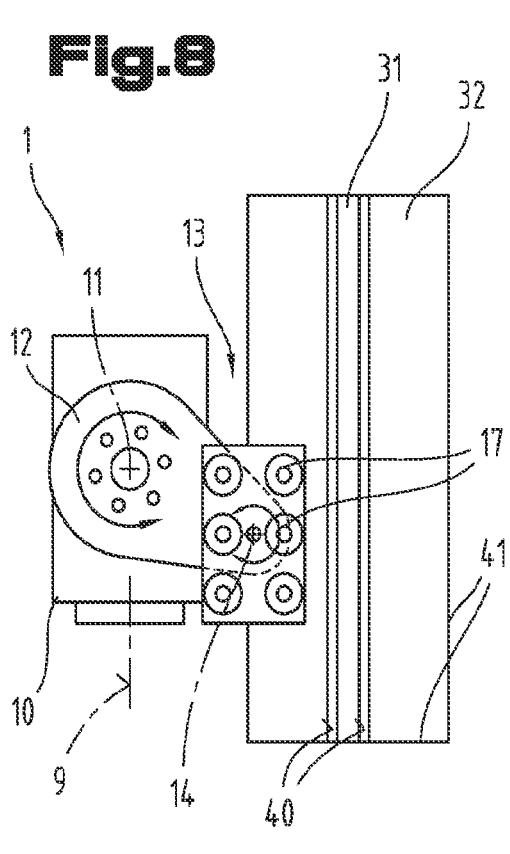

FIGS. 5 to 8 show positioning examples of a gripping arrangement 13, which can be arranged with a negative-pressure gripper 17 with a total of six negative-pressure gripper elements 18 In FIG. 5, the gripping arrangement 13 is oriented at an angle of 0° with respect to the lower tool 31. In the following FIGS. 6 to 8, a rotational movement of the gripping arrangement 13 took place about the second axis of rotation 14. This rotational movement took place in FIG. 6 at an angle of 90°, in FIG. 7 at 180° and in FIG. 8 at 270°. This illustrates that, while the gripping arrangement 13 rotates between the position according to FIG. 5 and the position according to FIG. 8 at approximately 270° about the second axis of rotation 14, the gripper support arm 12 need only carry out a rotational movement about the first axis of rotation 11 of only 90° approximately. This can be fulfilled in particular by forming a toothed belt transmission 25, comprising a first gear 26, which is rotatable about the first axis of rotation 11 and comprising a second gear 27, which is rotatable about the second axis of rotation 14. The toothed belt transmission 25 can comprise a belt 28, which couples the first gear 26 and the second gear 27 in terms of movement. A desired transmission ratio between the first gear 26 and the second gear 27 can be technically realized in that the first gear 26 has a larger diameter than the second gear 27. FIGS. 9 to 11 also show that, if necessary, those two angular range quadrants can also be reached with the gripping arrangement 13 that face away from the bending table 32. Between FIGS. 9 to 11, the gripper support arm 12 performs a comparatively small rotational movement of approximately 45°, while the gripping arrangement 13 rotates by 180°.

Figure 12:
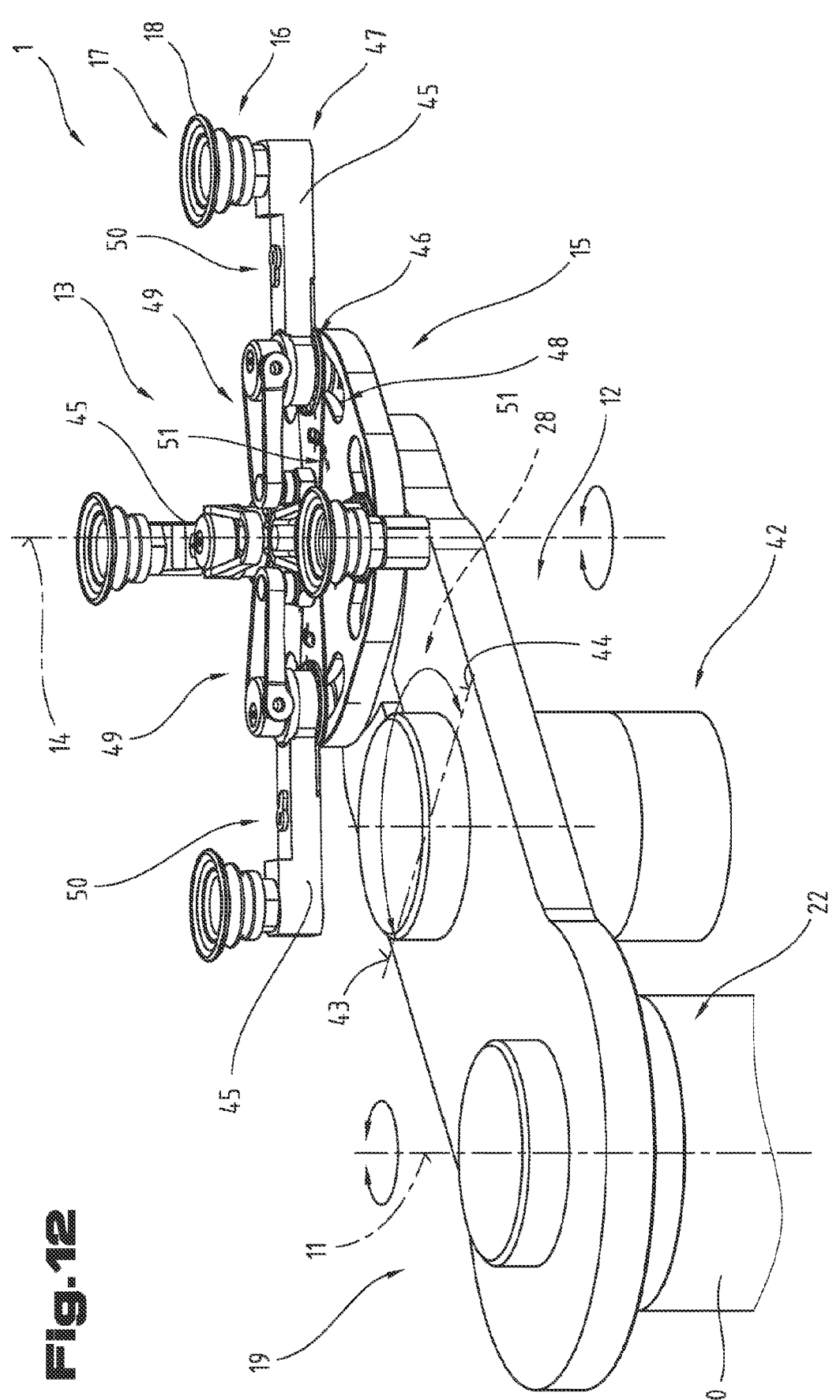

FIG. 12 shows a further advantageous embodiment, in which a first rotary drive (not shown) can be configured to rotate the gripper support arm 12 about the first axis of rotation 11 and in which a second rotary drive 42, acting independently of the first rotary drive, can be configured to rotate the gripping arrangement 13 about the second axis of rotation 14. In principle, in order to avoid repetitions, reference is again made to the preceding description of FIG. 2. In the embodiment according to FIG. 12, the second rotary drive 42 can be configured as an electromotive actuator or as a pneumatic actuator and can be fastened to the gripper support arm 12. For this purpose, the second rotary drive 42 can be coupled to the gripping arrangement 13 in terms of movement by a belt 28, for example. An electromotive actuator config-used as a stepping motor is preferable. The second rotary drive 42 can be configured to rotate the gripping arrangement 13 between a first end stop 43 and a second end stop 44, wherein a rotational movement of up to 180° can preferably take place between the first end stop 43 and the second end stop 44.

Furthermore, FIG. 12, shows that the base element 15, with at least two gripper element support arms 45, can comprise respectively a first end portion 46 and respectively a second end portion 47. The gripper element support arms 45 can be radially spaced apart from the second axis of rotation 14, and can be guided and releasably fixed at their first end portion 46 in preferably arcuate guide sections 48 in the base element 15 of the gripping arrangement 13 in a manually or automatically adjustable manner. In particular, if the adjustment can take place manually, it may be expedient to provide a scale 51 in the vicinity of the guide sections 48, preferably in the base element 15, said scale enabling more precise adjustability. In this case, the gripper element support arms 45 can comprise a gripper element 16 at their second end portion 47. Of course, such an advancement would not necessarily be coupled to the example according to FIG. 12 but could also be used, for example, in the arrangement according to FIG. 2.

The at least two gripper element support arms 45 can, preferably in the region of their respective first end portion 46, comprise fixing means 49, said fixing means being configured to releasably fix the at least two gripper element support arms 45 relative to the base element 15. This fixing means 49 is shown as an example in FIG. 12 as a bow-shaped lever and is shown in a position releasably fixed to the base element 15.

A vacuum line 19 of the at least one negative-pressure gripper element 18 can be formed with a fluidic shut-off element 50, for example with a shut-off valve. As shown in FIG. 12, such a shut-off element 50 can be formed on or in a gripper element support arm 45. However, a shut-off element 50 can also be formed, for example, in the base element 15 or in the vicinity of a negative-pressure gripper element 18 or a suction cup of a negative-pressure gripper element 18.

With respect to its pivot axes, the manipulator 1 can exclusively comprise said horizontal first pivot axis 5, said horizontal second pivot axis 7, said horizontal third pivot axis 9, said first axis of rotation 11 and said second axis of rotation 14. This can of course be equally advantageous for all of the exemplary embodiments shown in the figures.

The embodiments show possible configuration variants, however it is noted at this point that the invention is not restricted to the configuration variants of the same specifically shown, rather various combinations between the individual configuration variants are possible and these possible variants can be developed using the knowledge of the person skilled in the art working in this field based on the teachings of technical practice offered by the current invention.

The scope of protection is determined by the claims. However, the description and the drawings are to be referenced for the interpretation of the claims. Individual features or combinations of features from the various exemplary embodiments shown and described can represent independent inventive solutions in themselves. The problem to be solved, upon which the independent, inventive solutions are based, can be derived from the description.

All value ranges specified in the current description are to be understood such that they include any and all sub-ranges e.g. the specification 1 to 10 is to be understood such that all sub-ranges, starting from the lower limit 1 and the upper limit 10 are included i.e. all sub-ranges begin with a lower limit of 1 or more and end at an upper limit of 10 or less e.g. 1 to 1.7, or 3.2 to 8.1 or 5.5 to 10.

As a matter of form and by way of conclusion, it is noted that, to improve understanding of the structure, elements have partially not been shown to scale and/or enlarged and/or shrunk.

| List of reference numerals | |
| --- | --- |
| 1 | Manipulator |
| 2 | Component |
| 3 | Guide arrangement |
| 4 | Base body |
| 5 | First pivot axis |
| 6 | First swivel arm |
| 7 | Second pivot axis |
| 8 | second swivel arm |
| 9 | Third pivot axis |
| 10 | Third swivel arm |
| 11 | First axis of rotation |
| 12 | Gripper support arm |
| 13 | Gripping arrangement |
| 14 | Second axis of rotation |
| 15 | Base element |
| 16 | Gripper element |
| 17 | Negative-pressure gripper |
| 18 | Negative-pressure gripper element |
| 19 | Vacuum line |
| 20 | '20' transition portion |
| 21 | First pivot bearing |
| 22 | Coupling |
| 23 | Second pivot bearing |
| 24 | Torque support |
| 25 | toothed belt transmission |
| 26 | First gear |
| 27 | Second gear |
| 28 | Belt |
| 29 | Height |
| 30 | Structural height |
| 31 | Lower tool |
| 32 | Bending table |
| 33 | Bending machine |
| 34 | First support arm portion |
| 35 | Second support arm portion |
| 36 | Support arm length |

-continued

| List of reference numerals | |
| --- | --- |
| 37 | Bending installation |
| 38 | Guide axis |
| 39 | Press beam |
| 40 | Component support level |
| 41 | Boundary edge |
| 42 | Second rotary drive |
| 43 | First end stop |
| 44 | Second end stop |
| 45 | Gripper element support arm |
| 46 | First end portion |
| 47 | Second end portion |
| 48 | Guide portion |
| 49 | Fixing means |
| 50 | Shut-off element |
| 51 | Scale |

The invention claimed is:

1. A manipulator for components, wherein the manipulator is configured to pick up, transport, hold and set down a component, comprising:

a base body, which can be mounted in a stationary manner or moved along a guide arrangement;

a first pivot arm pivotally coupled to the base body via a horizontal first pivot axis;

a second pivot arm pivotally coupled to the first pivot arm via a horizontal second pivot axis; and a third pivot arm pivotally coupled to the second pivot arm via a horizontal third pivot axis;

wherein a first axis of rotation extending radially to the third pivot axis is formed on the third pivot arm;

wherein a gripper support arm rotatably coupled to the third pivot arm via the first axis of rotation is formed, wherein the gripper support arm extends radially with respect to the first axis of rotation, and wherein a gripping arrangement is rotatably coupled to the gripper support arm via a second axis of rotation, which is spaced apart from the first axis of rotation, wherein the gripper support arm comprises a first support arm portion and a second support arm portion, the first support arm portion and the second support arm portion being arranged offset to one another in the direction of the first axis of rotation or the second axis of rotation.

2. The manipulator according to claim 1, wherein the first axis of rotation and the second axis of rotation are formed parallel to one another.

3. The manipulator according to claim 1, wherein the gripping arrangement comprises a base element rotatably mounted on the gripper support arm and a gripper element, which can be coupled to the base element as required.

4. The manipulator according to claim 3, wherein the gripper element comprises a pincer gripper and/or a magnetic gripper.

5. The manipulator according to claim 3, wherein the base element comprises at least two gripper-element support arms having a respective first end portion and a respective second end portion, said gripper-element support arms being radially spaced apart from the second axis of rotation, and said gripper-element support arms being adjustably guided at the respective first end portion of said gripper-element support arms in guide portions in the base element of the gripping arrangement and being releasably fixed, and said gripper-element support arms having a gripper element at the respective second end section of said gripper-element support arms.

6. The manipulator according to claim 5, wherein the at least two gripper-element support arms comprise a fixing lever configured to releasably fix the at least two gripper-element support arms relative to the base element.

7. The manipulator according to claim 3, wherein the gripper element comprises a negative-pressure gripper and wherein at least one negative-pressure gripper element is formed on the negative-pressure gripper.

8. The manipulator according to claim 7, wherein the at least one negative-pressure gripper element comprises a vacuum line with a fluidic shut-off element.

9. The manipulator according to claim 7, further comprising a vacuum line acting as a rotary union in a transition portion between the third pivot arm and the gripper support arm and/or in a transition portion between the gripper support arm and the gripping arrangement.

10. The manipulator according to claim 1, wherein the gripper support arm is rotatably coupled to the third pivot arm and by means of a first pivot bearing via a coupling, which can be activated and deactivated as required.

11. The manipulator according to claim 1, wherein the gripping arrangement is rotatably coupled to the gripper support arm by means of a second pivot bearing.

12. The manipulator according to claim 1, wherein a torque support is arranged on the third pivot arm.

13. The manipulator according to claim 1, further comprising a toothed belt transmission comprising a first gear, which is rotationally fixed relative to the first axis of rotation and comprising a second gear, which is rotatable about the second axis of rotation, and said toothed belt transmission comprising a belt, which couples the first gear and the second gear in terms of movement.

14. The manipulator according to claim 13, wherein the first gear has a larger diameter than the second gear.

15. The manipulator according to claim 1, wherein a first rotary drive is configured to rotate the gripper support arm about the first axis of rotation, and wherein a second rotary drive, which acts independently of the first rotary drive, is configured to rotate the gripping arrangement about the second axis of rotation.

16. The manipulator according to claim 15, wherein the second rotary drive is configured as an electromotive actuator, or wherein the second rotary drive is configured as a pneumatic actuator, and wherein the second rotary drive is fastened to the gripper support arm.

17. The manipulator according to claim 15, wherein the second rotary drive is configured to rotate the gripping arrangement between a first end stop and a second end stop, a rotational movement being possible, to be carried out between the first end stop and the second end stop.

18. The manipulator according to claim 1, further comprising a spur gear transmission comprising a first spur gear, which is rotatable about the first axis of rotation and comprising a second spur gear, which is rotatable about the second axis of rotation, wherein the first and the second spur gears interact directly or indirectly in a movement-coupled manner.

19. The manipulator according to claim 1, wherein the gripper support arm, including the gripping arrangement held on the gripper support arm, projects by a maximum height less than a structural height of a lower tool relative to a bending table of a bending machine.

20. The manipulator according to claim 1, wherein the gripper support arm has a support arm length extending between the first axis of rotation and the second axis of rotation, wherein the support arm length is shorter than a length of the first, second and/or third pivot arm.

21. The manipulator according to claim 1, wherein, with respect to its the first, second, and third pivot axes, the manipulator exclusively comprises said horizontal first pivot axis, said horizontal second pivot axis, said horizontal third pivot axis, said first axis of rotation and said second axis of rotation.

22. A bending installation comprising a bending machine, the at least one manipulator according to claim 1, a guide arrangement with a guide axis, the at least one manipulator being movable along said guide axis, or a fixed anchoring for the at least one manipulator, and an installation control, which is configured to predefine movements and/or movement sequences of the at least one manipulator.

23. The bending installation according to claim 22, wherein the bending machine comprises a bending table and a press beam, which can be adjusted relative to the bending table, and in that wherein at least one lower tool is positioned within outer boundary edges of the bending table, and comprises a component support plane for the vertical support of at least one component to be machined.

* * * * *